(12) United States Patent
Vesterlund

(10) Patent No.: US 6,306,069 B1
(45) Date of Patent: Oct. 23, 2001

(54) SPREADER ROLL

(75) Inventor: Ingmar Vesterlund, Pyhajoki (FI)

(73) Assignee: Suomen Intech Oy, Parhalati (FI)

( * ) Notice: Subject to any disclaimer, the term of this patent is extended or adjusted under 35 U.S.C. 154(b) by 0 days.

(21) Appl. No.: 09/462,301

(22) PCT Filed: Jun. 16, 1998

(86) PCT No.: PCT/FI98/00517

§ 371 Date: Mar. 27, 2000

§ 102(e) Date: Mar. 27, 2000

(87) PCT Pub. No.: WO99/02872

PCT Pub. Date: Jan. 21, 1999

(30) Foreign Application Priority Data

Jul. 7, 1997 (FI) ............................................. 972887

(51) Int. Cl.$^7$ ................................................... F16C 13/00
(52) U.S. Cl. ........................................................... 492/39
(58) Field of Search ............................... 492/45, 39, 40, 492/20, 46; 29/898.02, 895.2

(56) References Cited

U.S. PATENT DOCUMENTS

| | | | |
|---|---|---|---|
| 1,375,629 | * 4/1921 | Colgin | 492/45 |
| 1,984,115 | * 12/1934 | Cooper | 492/45 |
| 2,263,439 | * 11/1941 | Hansen | 492/45 |
| 3,918,774 | 11/1975 | Nicholson | 308/187 |
| 4,339,855 | 7/1982 | Demiere | 26/103 |
| 4,558,960 | 12/1985 | Lehtinen et al. | 384/373 |
| 4,716,637 | * 1/1988 | McIntosh et al. | 492/39 |
| 4,872,247 | * 10/1989 | Nakamura et al. | 492/40 |
| 4,875,263 | * 10/1989 | Furumura | 29/898.02 |
| 4,974,782 | * 12/1990 | Nelson | 241/227 |
| 5,018,881 | * 5/1991 | Asada | 384/113 |
| 5,538,347 | * 7/1996 | Itoh et al. | 384/107 |
| 5,549,154 | * 8/1996 | Niskanen et al. | 165/89 |
| 5,735,783 | * 4/1998 | Joensuu | 492/15 |
| 5,743,655 | * 4/1998 | Slavin et al. | 384/107 |
| 5,928,121 | * 7/1999 | Stotz et al. | 492/7 |

FOREIGN PATENT DOCUMENTS

| | | | |
|---|---|---|---|
| 7713243 | 2/1978 | (DE) | B65H/23/34 |
| 4124651 | 8/1992 | (DE) | F16C/13/00 |
| 0158242 | 10/1988 | (EP) | F16C/17/02 |

OTHER PUBLICATIONS

G. Kröger and M. Meyer, "Construction of an Air Bearing Assembly For Web–Spreading Rollers", Jan. 1990, pp. 25, 29 and 30.

* cited by examiner

Primary Examiner—S. Thomas Hughes
Assistant Examiner—Marc W. Butler
(74) Attorney, Agent, or Firm—Volpe and Koenig, P.C.

(57) ABSTRACT

The present invention relates to a spreader roll. The roll includes a curved central shaft and roll segments arranged in a rotary fashion to this and including a cylindrical shell and at least one radial supporting device oriented against the curved shaft. The roll segments are so arranged that water leaking into the spreader roll will not affect the roll function negatively. The radial supporting device and the curved shaft are hereby assembled together to rotate with one another with the aid of a slide bearing.

5 Claims, 1 Drawing Sheet

SPREADER ROLL

This invention concerns a spreader roll including a curved central shaft and in a rotary arrangement with this a roll segment including a cylindrical shell and at least one radial supporting device oriented against the curved shaft. Such devices are used e.g. to maintain the paper web width in paper manufacture.

BACKGROUND

It is a known practice to use so-called spreader rolls, which include a curved shaft, to which are arranged several cylindrical surface elements, so-called roll segments, which together form a longitudinal curved roll e.g. for guiding the paper web during the papermaking process. These roll segments in the spreader roll are usually joined to one another by various connecting means made of elastomer materials. These connecting means may hereby be glued to the inside of the cylindrical roll segments or they may form a sealing ring, against which the roll segments are compressed from both ends of the spreader roll. The purpose of the connecting means is both to ensure a uniform and similar rotation in all segments of the roll and at the same time to prevent impurities, mainly liquid of different kinds, from leaking in between the curved shaft and the surfaces of roll segments. The roll may also be provided with a rubber sock covering the segments.

However, the known art suffers from many drawbacks and defects. Firstly, it is difficult to arrange the connecting means to the cylindrical roll segments. The purpose of connecting means is to join adjacently located roll segments tightly to one another, so that no process liquid can penetrate into the spreader roll while it is rotating in the papermaking machine. Thus, the connecting means of the spreader roll may hereby be glued to the roll segments. However, such a glued joint is apt to break up little by little, whereby it will lead process water into the roll in this way. Such a construction is also difficult to repair, because each glued joint must first be undone for maintenance of the roll, whereupon the connecting means must once more be glued to the roll segments. The work thus demands very much time while the service life of the construction is not the best possible. Other traditional solutions are to arrange various types of sealing rings between the roll segments, whereby the roll segments will be compressed against each other, and the sealing ring will in this way seal the joints between the segments of the roll. However, such connecting devices are heavy and will be subject to much wear during the rotary motion of the roll, which in time will result in an occurrence of leakage and play.

If there is leakage between connecting means and roll segments, then as time passes process liquid, usually water, will leak into the spreader roll. Since the spreader roll includes a longitudinal curved homogenous shaft and also roll segments mounted on ball bearings, the leaking water will in time corrode the bearing surfaces in the roll segments. Bearings thus subject to corrosion will stop rotating before long, which will cause trouble in the spreader roll and will finally cause wear and tear in the paper web.

On the other hand, play in the connecting means results in an uneven and abrupt rotation of the roll segment. Such a motion will cause wear and tear in the paper web and will thus destroy the paper surface.

SUMMARY

With the present Invention the problems of the known solutions are avoided. The purpose of this invention is thus to provide a spreader roll, wherein the roll segments are arranged in such a way that any water leaking into the spreader roll can not affect the roll function negatively.

The said problems are solved through the characteristic features of the present invention which are described in the claims. A device according to the present Invention is characterised in that the radial supporting device and the curved shaft are assembled together with a slide bearing in a rotary fashion.

The invention is based on the idea that instead of shutting out water leaking from the papermaking machine to the spreader roll, the spreader roll is constructed in such a way that any leaking water will not cause any kind of problem for the mounting in bearings of roll segments to the spreader roll shaft.

Several considerable benefits are achieved with the present invention in comparison with state-of-the-art solutions. A spreader roll is thus obtained, the construction of which is much more durable than earlier solutions. The new bearing construction ensures that the roll segments will always rotate around the shaft at the same speed. In this way all imaginable wear and tear are avoided in the paper web.

It is an essential advantage that a long shaft diameter may be used without any big ball bearings. A big ball bearing tends to act as a slide bearing, because the load in a spreader roll is always very small compared with the load for which such a ball bearing is dimensioned.

Since the mounting of the roll segments In bearings to the shaft has a very low inertia according to the present invention, the roll segments will achieve their full rotary speed much faster than with earlier solutions. The work speed of the roll can hereby be achieved in a shorter time than with traditional solutions. This results in a more uniform transport speed in the paper web already in the early production phase, whereby cockling in the paper web is avoided and the paper obtains a higher quality.

Since water leaking in does not cause any kind of problem to the mounting in bearings according to the present invention, the service interval is considerable longer for a spreader roll provided with the present invention. In this way an improved reliability of service is obtained along with lower operating costs. Service costs are also reduced, because a construction according to the present invention is considerably easier to service.

BRIEF DESCRIPTION OF THE DRAWINGS

The invention will be described more closely in the following with reference to the drawing, wherein.

DETAILED DESCRIPTION OF THE PREFERRED EMBODIMENT(S)

Figure 1:
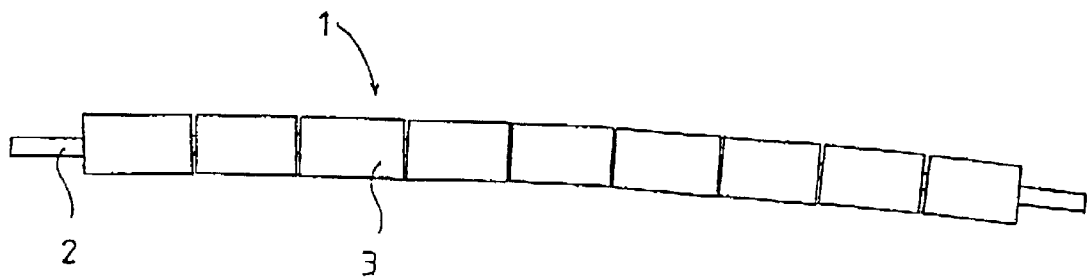
FIG. 1 is a cross-section of a spreader roll according to the present invention.
Figure 2:
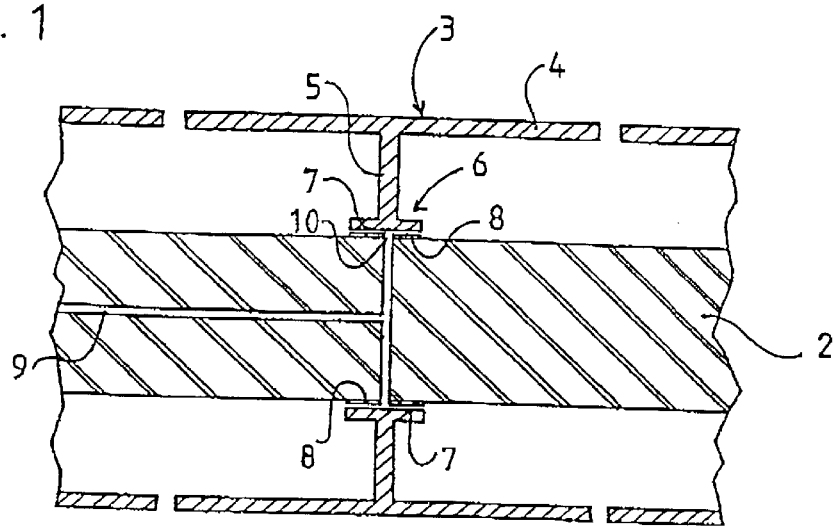
FIG. 2 is a detail drawing of a roll segment mounted in bearings to the spreader roll shaft in accordance with the present invention.

FIGS. 1 and 2 show a preferable embodiment of a spreader roll 1 according to the present Invention. Such a spreader roll 1 thus includes a curved central shaft 2, which is mounted in bearings to driving means at its both ends. The spreader roll 1 includes roll segments 3, which are arranged in a rotary fashion to the central shaft 2. Such roll segments 3 preferably include a cylindrical shell 4 and at least one radial supporting device 5 arranged rigidly to the shell 4 and oriented against the curved shaft 2. Such supporting devices may be arranged essentially to the midpoint of the roll segment 3 or to its each end.

The radial supporting device 5 is assembled in a rotary fashion with the curved shaft 2 using a slide bearing 6 having an outer friction surface 7 attached to the supporting device 5 and an inner surface 8 attached to said curved shaft 2. A slide bearing according to the present invention may include constructions known as such of ceramics, Teflon-treated metal surfaces, brass or some other known material, such as carbon fibre or various composite materials.

When a spreader roll 1 according to the invention is used in the so-called wet end of a papermaking machine, the advantageous function of the slide bearing 6 can be further improved by insisting a water layer between its friction surfaces, that is, the inner surface 8 of the curved shaft which is attached thereto in a non-rotary fashion and the outer surface 7 of the radial supporting device 5. This water layer can be obtained by pumping water through pipelines 9 to the slide bearing 6, where it is arranged to be spread between the friction surfaces through nozzles 10 in the inner surface 8. However, it is also possible to use process water leaking in between the friction surfaces.

If the spreader roll 1 is used in the so-called dry end of the machine, then instead of water or process water preferably pressurised gas may be led in between the friction surfaces in this way to improve their sliding properties by obtaining an air cushion between the surfaces. The gas may preferably be compressed air.

Figure 3:
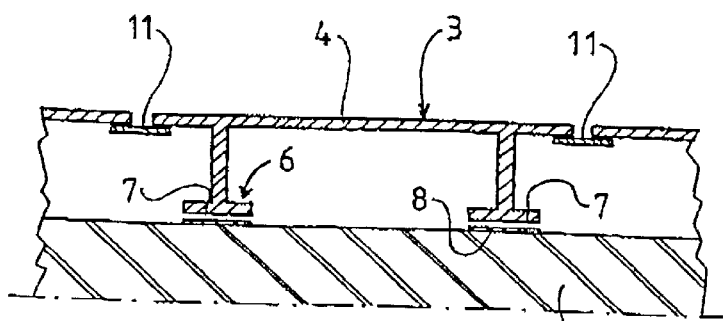
FIG. 3 is a detail drawing of roll segments mounted in bearings to the spreader roll shaft in accordance with a second embodiment of the present invention.

The spreader roll 1 may also be shaped as shown in FIG. 3. The roll segment 3 hereby has supporting devices 5 at its each end. Moreover, roll segments 3 located adjacent to one another are arranged essentially close to one another with an elastic clutch 11 known as such.

A spreader roll 1 as shown in FIG. 3 may be equipped with both friction improving water or gas layers as described above.

The description above and the figures therein mentioned are only intended to illustrate the present invention. The invention is thus not limited only to the embodiment described in the foregoing or in the claims, but several variations or alternative embodiments are possible within the idea of the invention described in the appended claims.

What is claimed is:

1. Spreader roll comprising:

a curved central shaft;

roll segments rotatably mounted on said curved central shaft;

each roll segment having a cylindrical shell within which is contained at least one radial support;

a slide bearing associated with each roll segment having a first friction surface on said central shaft and a second fiction surface on said radial support thereby providing a rotational mounting for the roll segment on said curved shaft; and said curved shaft including nozzles for injecting a sliding agent between said first surface and said second surface of each said slide bearing.

2. A spreader roller according to claim 1 wherein the sliding agent is a liquid.

3. A spreader roller according to claim 1 wherein the sliding agent is water.

4. A spreader roller according to claim 1 wherein the sliding agent is gas.

5. A spreader roller according to claim 1 wherein the sliding agent is compressed air.

* * * * *